(12) United States Patent
Shlemenzon et al.

(10) Patent No.: US 10,536,011 B2
(45) Date of Patent: Jan. 14, 2020

(54) UTILITY POWER GRID SUBSTATION AUXILIARY POWER SYSTEM

(71) Applicant: San Diego Gas & Electric Company, San Diego, CA (US)

(72) Inventors: Yakov Shlemenzon, San Diego, CA (US); Cory Mitsui, San Diego, CA (US)

(73) Assignee: San Diego Gas & Electric Company, San Diego, CA (US)

( * ) Notice: Subject to any disclaimer, the term of this patent is extended or adjusted under 35 U.S.C. 154(b) by 45 days.

(21) Appl. No.: 15/421,229

(22) Filed: Jan. 31, 2017

(65) Prior Publication Data

US 2017/0264138 A1 Sep. 14, 2017

Related U.S. Application Data

(60) Provisional application No. 62/307,801, filed on Mar. 14, 2016.

(51) Int. Cl.
*H02J 9/06* (2006.01)
*H02J 7/00* (2006.01)
*H02J 1/00* (2006.01)

(52) U.S. Cl.
CPC .............. *H02J 7/0029* (2013.01); *H02J 1/00* (2013.01); *H02J 9/061* (2013.01); *H02J 2007/004* (2013.01)

(58) Field of Classification Search
CPC ........ H02J 9/02; H02J 9/04; H02J 9/06; H02J 9/061; H02J 9/062
See application file for complete search history.

(56) References Cited

U.S. PATENT DOCUMENTS

| 7,862,947 B2 | 1/2011 | Ronne | |
|---|---|---|---|
| 8,373,381 B2 | 2/2013 | Raiser et al. | |
| 2007/0190369 A1* | 8/2007 | Leach | H02J 7/0018 429/9 |
| 2007/0254193 A1* | 11/2007 | Lam | H01M 8/02 429/431 |
| 2008/0179958 A1* | 7/2008 | Lathrop | H02J 9/06 307/68 |

FOREIGN PATENT DOCUMENTS

WO 2010/063326 A1 6/2010

OTHER PUBLICATIONS

Patent Cooperation Treaty, International Sear Report for PCT/US2017/021642, dated Jun. 1, 2017, pp. 1-2.
International Preliminary Report on Patentability in PCT/US2017/021642, dated Sep. 18, 2018.
International Preliminary Report on Patentability in PCT/US2017/021642, dated Sep. 28, 2019.

* cited by examiner

*Primary Examiner* — Rexford N Barnie
*Assistant Examiner* — Elim Ortiz
(74) *Attorney, Agent, or Firm* — Sheppard Mullin Richter & Hampton LLP

(57) ABSTRACT

An auxiliary power system for electrical substations is provided. The auxiliary power system enables both AC and DC equipment to be powered during prolonged power outages, and utilizes a substation fuel cell to provide a backup power source for designated black start cranking path substations.

7 Claims, 8 Drawing Sheets

UTILITY POWER GRID SUBSTATION AUXILIARY POWER SYSTEM

REFERENCE TO RELATED APPLICATIONS

This application claims priority to U.S. Provisional Patent Application No. 62/307,801, filed Mar. 14, 2016, the content of which is incorporated herein by reference in its entirety.

TECHNICAL FIELD

The disclosed technology relates generally to standby auxiliary power for electrical substations, and more particularly, some embodiments relate to standby auxiliary power systems for black start cranking path (CP) substations.

DESCRIPTION OF THE RELATED ART

Electrical substations are an important part of the utility power grid, transforming electricity from generating stations to be acceptable to other parts of the grid and customers. A variety of DC-powered and AC-powered equipment is present at electrical substations, requiring that both AC and DC power is available at the substation to keep the equipment powered. When a power outage or interruption occurs, no electricity enters the substation over the transmission lines, leaving the substation without an external power supply.

Selected electrical substations are designated as black start cranking path (CP) substations. The black start CP is a portion of the electric system that during prolonged electric grid power interruption—when substation batteries are completely discharged—may be isolated and then energized from backup power sources to create a "cranking path." The "cranking path" enables startup of one or more other generating units in the grid, such as larger power-generating plants.

BRIEF SUMMARY OF EMBODIMENTS

According to various embodiments of the disclosed technology provides a solution for the integrated backup power system suppling DC and AC power during prolonged main grid interruption. The solution uses the combination of fuel cell and substation battery enhanced by automated switching mechanisms to set the preferred power source during various system outage and load scenarios.

One embodiment of the disclosed technology provides an integrated auxiliary power system for electrical substations. The auxiliary power system enables both AC and DC equipment to be powered during prolonged power outages, and utilizes a combination of substation battery and fuel cell to provide a backup power source for designated black start cranking path substations.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
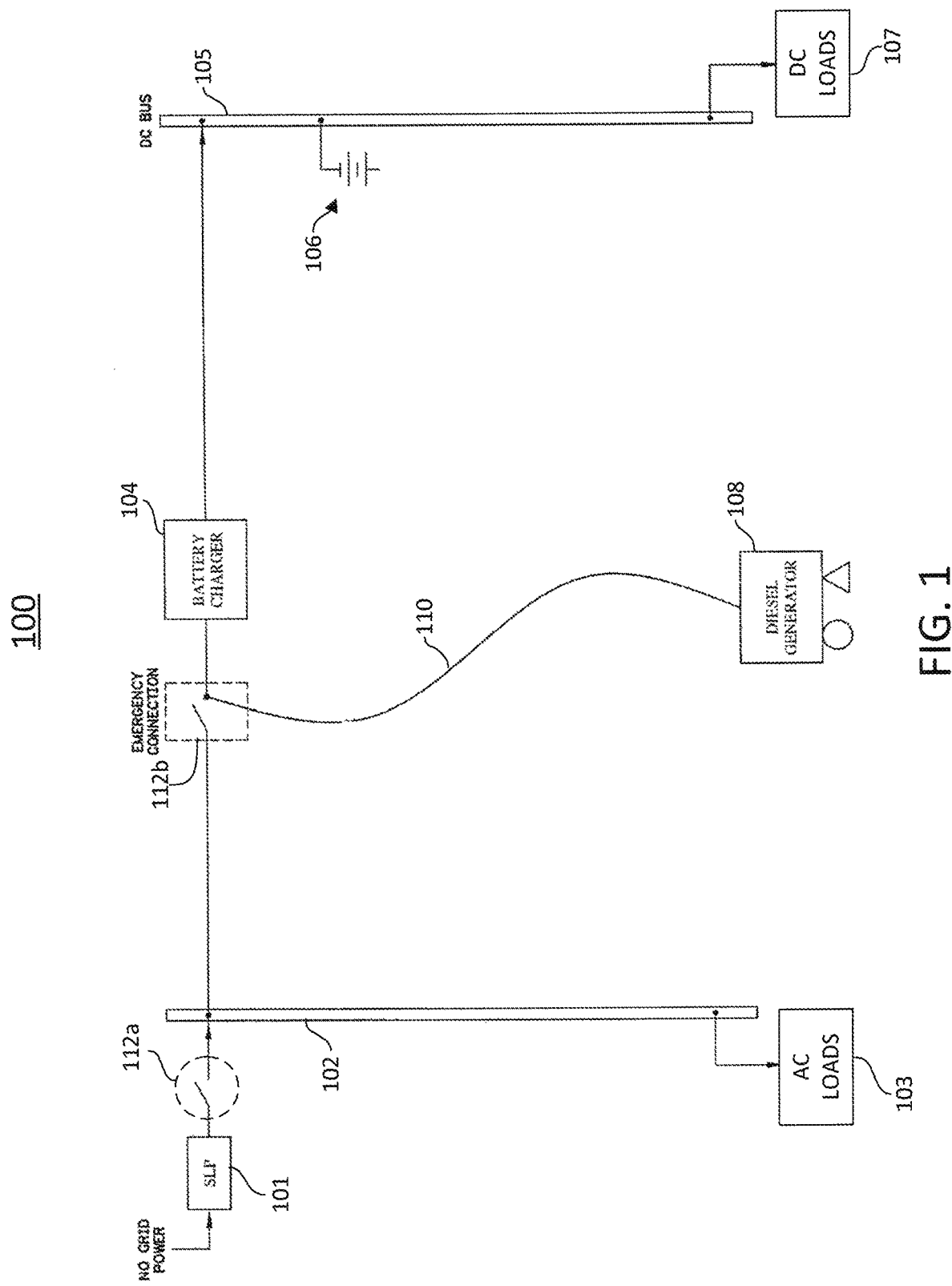
FIG. 1 is a circuit diagram of a CP substation in accordance with embodiments disclosed herein.

Electrical substation equipment includes both AC and DC equipment. Non-limiting examples of AC loads include: circuit breakers; motor operated disconnects (MODs); substation lighting; and HVAC systems. Non-limiting examples of DC loads include: protection relay; metering device; monitoring equipment; and telecommunication equipment. The substation is provided with AC power from the power grid. The DC power is provided by substation batteries that are kept charged by AC battery chargers. FIG. 1 is a circuit diagram of a CP substation 100 with a traditional diesel generator backup system installed during interruption of main grid power As illustrated, the station light and power transformer (SLP) 101, normally suppling AC power to AC bus 102, has been isolated from this bus by opened switch 112*a* A battery charger 104 AC input is disconnected form the AC bus 102 by opening switch 112*b* and connected to diesel generator via temporary black start cable 110. *b* (as illustrated in FIG. 1).

The battery charger 104 energizes the DC bus 105, charging the substation batteries 106. In some embodiments, multiple substation batteries 106 may be provided to increase the overall capacity of the substation 100. The substation batteries 106 are designed to provide backup power for switching, control, protection, and communication equipment in the event of a power outage at the substation. Such equipment comprises the DC loads 107 connected to the DC bus 105. For outages that extend beyond the capacity of the substation batteries 106, emergency power is needed to maintain a charge on the substation batteries 106. Traditionally, a diesel generator 108 is installed at the CP substation 100. The diesel generator 108 is connected to the battery charger 104 via a black start cable 110.

As discussed above, during outages the only substation batteries 106 provide the power necessary to maintain backup services and restoration processes. As illustrated in FIG. 1, the substation batteries 106 energize only the DC bus 105, leaving the AC bus 102 de-energized. In other words, any AC loads 103 are unpowered during the outage. Some of the AC loads 103, however, are needed in the black start operation. For example, certain circuit breakers and MODs are operated by AC motors, and must be operational in order to energize portions of the power grid during the black start. Accordingly, substations selected to be part of the cranking path (i.e., designated black start CP substations), must be modified to replace AC motors controlling the loads with DC motors. Once modified, the circuit breaker, MODs, or other normally AC load 103 becomes a DC load 107, connected to the DC bus 105. The substation batteries 106 may now power the equipment. This is an expensive retrofit for electrical substations that requires replacing original equipment and redesigning the auxiliary backup system.

Diesel generators have several limitations that limit their effectiveness as a backup power source. Diesel generators have limited run time, partially caused by fuel supply requirements, which impacts the length of time for which emergency power may be provided. Once a diesel generator has reached the end of its run time, it is impossible to maintain the charge on the substation batteries. If the power outage continues beyond this point, the substation batteries may be fully discharged resulting in critical equipment going offline, impacting the ability to complete the black start process. Emissions restrictions, zoning ordinances, and other environmental and legal constraints limit the number, type, and locations of diesel generators, which in turn impacts which substations may be designated to be within the cranking path. This may impact the efficiency and speed with which power may be restored in the case of an emergency.

Embodiments of the technology disclosed herein is directed toward a devices and methods for providing auxiliary power to electrical substations. More particularly, various embodiments of the technology disclosed herein relate to auxiliary power systems capable of providing sufficient emergency power to ensure operation of critical substation equipment during prolonged power outages, without the need for modification of substation equipment. Moreover, various embodiments of the technology disclosed herein implement a substation fuel cell as the backup power source, avoiding many of the issues associated with diesel generators currently used within the industry.

Figure 2A:
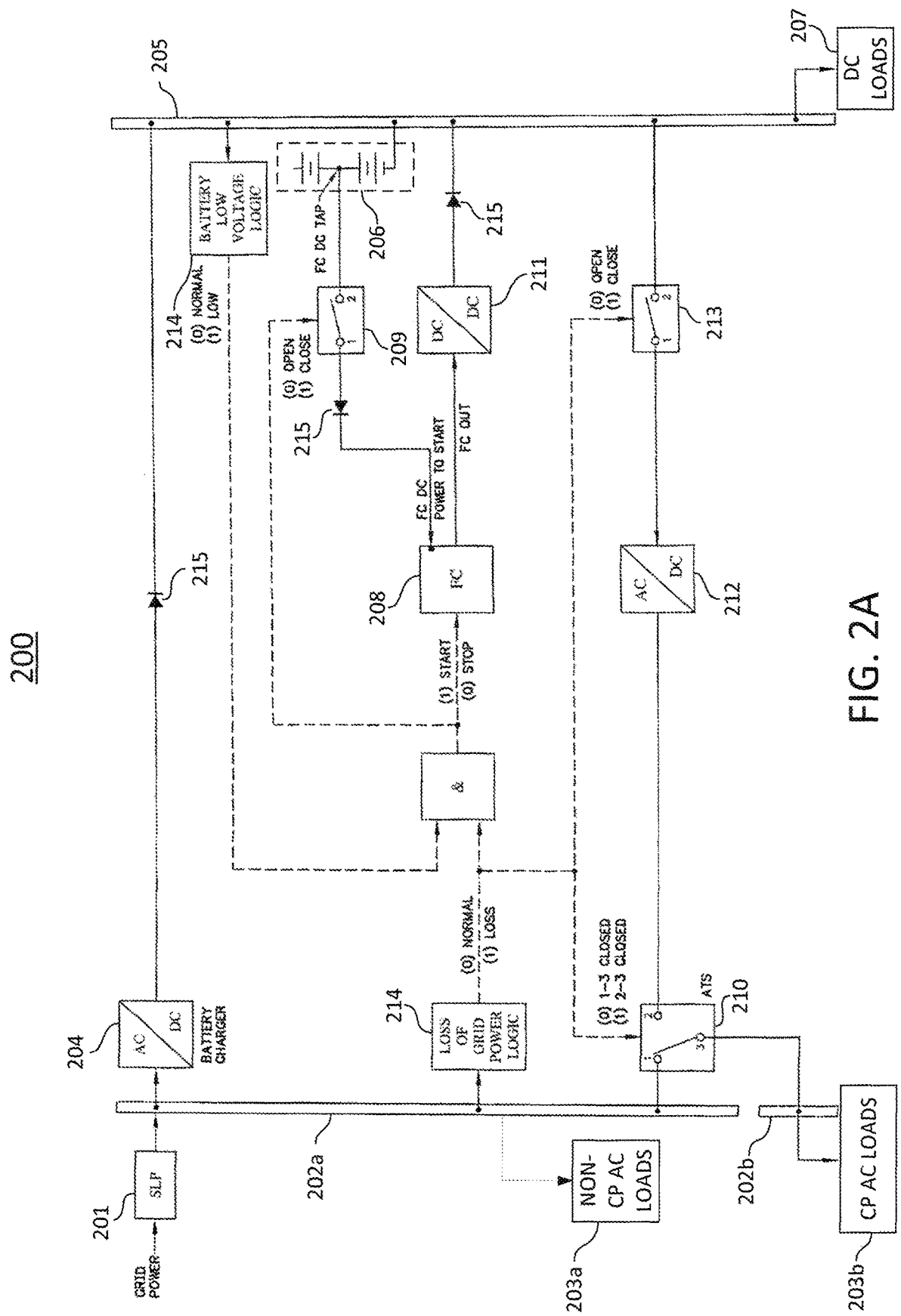
FIG. 2A is a circuit diagram of a CP substation in accordance with embodiments disclosed herein.

FIG. 2A is a circuit diagram of a CP substation 200 in accordance with embodiments of the technology disclosed herein. As illustrated in FIG. 2A, various embodiments include a station light and power transformer 201, AC bus 202a, battery charger 204, DC bus 205, substation batteries 206, and DC loads 207. In various embodiments, a substation fuel cell 208 may be integrated into the CP substation 200 to provide emergency power, instead of the diesel generator 108 discussed with respect to FIG. 1.

Substation fuel cell 208 provides several advantages over diesel engines, including providing a clean energy alternative (e.g., no carbon emissions), more scalability, lower operating noise, and less preventative maintenance required. As illustrated in FIG. 2A, substation fuel cell 208 is connected to the substation batteries 206. In this way, substation fuel cell 208 utilizes the substation batteries 206 during startup, unlike traditional fuel cells that require a separate startup power source. The startup procedure for the substation fuel cell will be discussed in greater detail with respect to FIG. 2C. A switch 209 enables substation fuel cell 208 to remain disconnected from substation batteries 206 until needed.

The output of substation fuel cell 208 is connected to the DC bus 205, enabling substation fuel cell 208 to energize DC bus 205 when operating. A diode 215 may be disposed in various embodiments between substation fuel cell 208 and DC bus 205 to ensure that electricity cannot flow back to substation fuel cell 208 from DC bus 205. Similar diodes may be disposed between substation fuel cell 208 and substation batteries 206 (such that electricity cannot flow directly from substation fuel cell 208 to substation batteries 206) and/or between the battery charger 204 and DC bus 205 (such that electricity cannot flow from DC bus 205 to battery charger 204). In various embodiments, a DC/DC converter 211 may be placed on the output of substation fuel cell 208.

Unlike CP substation 100 discussed with respect to FIG. 1, CP substation 200 of FIG. 2A has two AC buses: main AC bus 202a, and CP AC bus 202b. In various embodiments, main AC bus 202a is similar to AC bus 102 discussed with respect to FIG. 1. CP AC bus 202b provides a separate AC bus to power selected AC equipment (CP AC loads 203b) that should be powered during the black start. Only certain critical equipment is necessary to be powered during an outage. Accordingly, AC equipment not needed for the black start (non-CP AC loads 203a) can remain connected on the main AC bus 202a. In various embodiments, an automatic transfer switch (ATS) 210 may be included, with main AC bus 202a connected to a first node and the CP AC bus 202b connected to a third node. During normal operation, the ATS 210 may be engaged such that the first node and third node are electrically connected, as illustrated in FIG. 2A. In this position, CP AC bus 202b may be energized by main AC bus 202a.

An AC/DC inverter 212 is connected to a second node of the ATS 210 in CP substation 200, with a switch 213 connecting the AC/DC inverter 212 to the DC bus 205. As explained in greater detail with respect to FIGS. 2C and 2D, the AC/DC inverter 212 converts a portion of the DC power from the DC bus 205 to AC power, and supplies that power to the CP AC bus 202b via the ATS 212, thereby energizing the CP AC loads 203b needed during the black start process.

The dotted lines connecting various portions of the circuit diagram of FIG. 2A (and similarly in FIGS. 2B, 2C, and 2D) indicate logic signals. Monitoring components 214 may be coupled to the main AC bus 202a and DC bus 205 and configured to identify voltage conditions on the buses. For example, the monitoring component 214 coupled to main AC bus 214 may be configured to register when main AC bus 202a is de-energized, indicating a loss of power from the utility grid. With respect to DC bus 205, the monitoring component 214 coupled to DC bus 205 may be configured to register when the voltage level across DC bus 205 falls below a depletion threshold, thereby sending an indication to power up the substation fuel cell 208. The monitoring components 214 may comprise any type of voltage, current, or other electrical metering tool in various embodiments, and may be implemented in hardware or software.

Figure 2B:
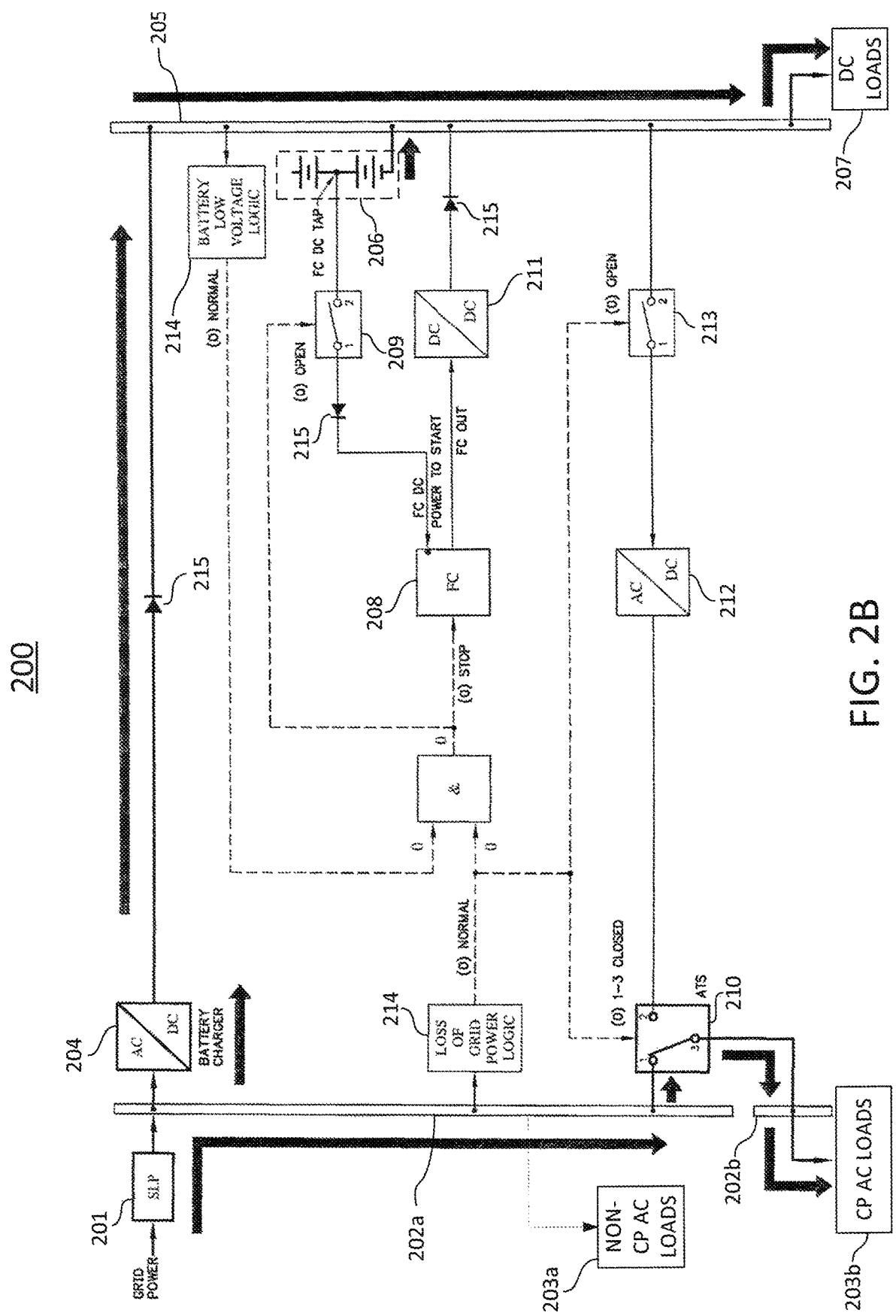
FIG. 2B is a diagram illustrating power flow through a CP substation during normal operation in accordance with embodiments disclosed herein.

FIG. 2B shows power flow during normal operation through the circuit of example CP substation 200 in accordance with embodiments of the technology disclosed herein. Normal operation means that the external transmission lines from the utility power grid are energized, providing AC power to the substation as intended. As illustrated, AC power flows into the station through SLP 201, energizing main AC bus 202a. ATS 210 is set to the first position, electrically connecting the first node and the third node. In this position, the AC power flows through main AC bus 202a and ATS 210 to energize the CP AC bus 202b. During normal operation, all AC loads (non-CP 203a, CP 203b) are operational and powered from the power grid. The monitoring component 214 coupled to main AC bus 202a would register that main AC bus 202a is energized, and would therefore indicate to the substation monitoring equipment this state (as illustrated in FIG. 2B as a binary "0"). This state is indicated to the ATS 210 and switch 213 (via the monitoring component 214 or by the substation monitoring equipment), to set or maintain the ATS 210 in a first position and switch 213 in an open position.

Energized main AC bus 202a powers the battery charger 204, which converts a portion of the incoming AC power from the utility grid into DC power, and energizes DC bus 205. This is electrically no different than other substations during normal operation.

Figure 2C:
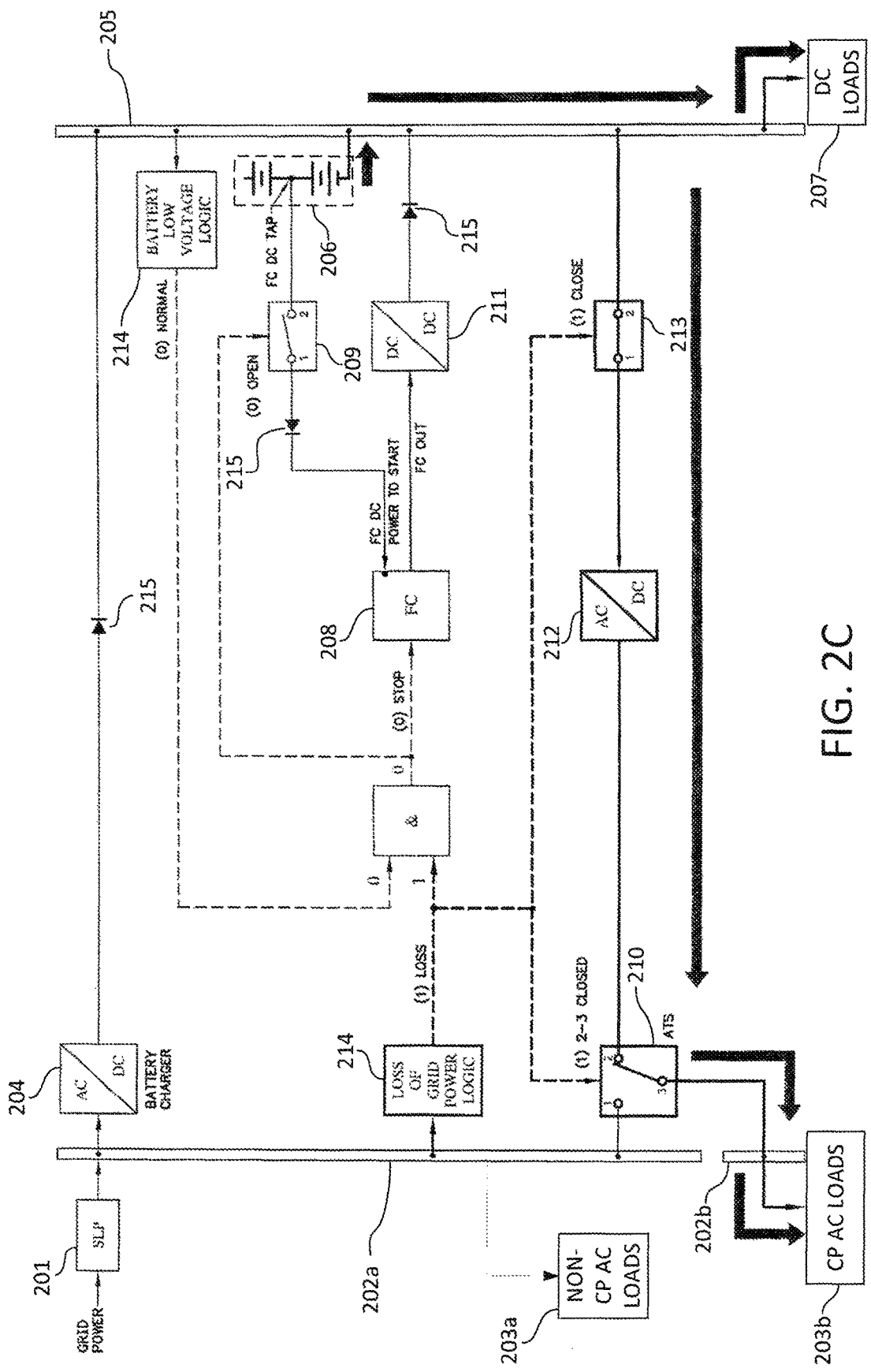
FIG. 2C is a diagram illustrating power flow through a CP substation during a power failure in accordance with embodiments disclosed herein.

FIG. 2C shows power flow in the event of a power grid failure through the circuit of example CP substation 200 in accordance with embodiments of the technology disclosed herein. When the power grid fails, a power outage or interruption results and the CP substation 200 is no longer energized by the power grid. Therefore, no power flows through the battery charger 204 to energize the DC bus 205. In response, the substation batteries 206 discharge stored energy to energize the DC bus 205, thereby powering the DC loads 207.

Main AC bus 202a is no longer energized, and the monitoring component 214 coupled to the main AC bus 202a would indicate to the substation monitoring equipment a de-energized state (as illustrated in FIG. 2C as a binary "1"). This state is indicated to the ATS 210 and switch 213 (via the monitoring component 214 or by the substation monitoring equipment), to set or maintain the ATS 210 in a second position and switch 213 in a closed position. The second position of the ATS 210 electrically couples the CP AC bus 202b to the AC/DC inverter 212. By closing the switch 213, the line from DC bus 205 to the CP AC bus 202b is energized. The AC/DC inverter 212 serves to convert the DC power into suitable AC power for use by the selected CP AC loads 203b, maintaining operation of those select AC equipment.

As illustrated in FIG. 2C, by including a circuit setup in such a manner a black start CP substation may maintain power to critical equipment without the need to retrofit AC motors for DC motors. The CP substation 200 may power the select AC equipment via the substation batteries 206 through the use of the inverter 212. This type of circuit arrangement may be applicable at non-black start substations, as well, to avoid having all AC loads be de-energized during a power outage. Such an implementation (at non-black start designated substations) may result in a quicker drain on substation batteries, which may necessitate an increase in the capacity of the substation batteries.

Figure 2D:
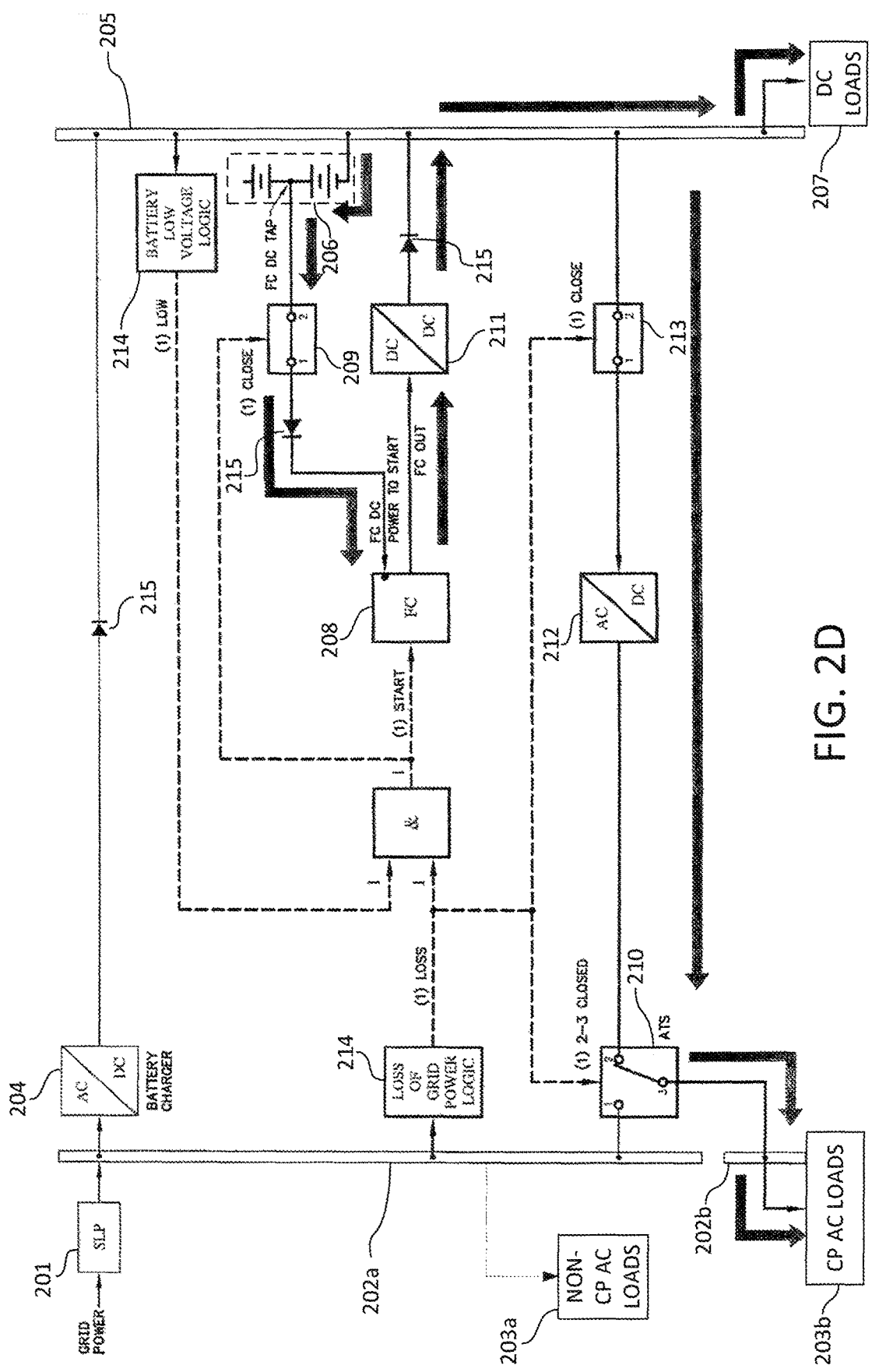
FIG. 2D is a diagram illustrating fuel cell auxiliary system operation during a power failure in accordance with in accordance with embodiments disclosed herein.

As discussed above, black start CP substations (such as the CP substation 200 of FIGS. 2A, 2B, 2C, and 2D) require an auxiliary power source to deal with prolonged power outages, in which case substation batteries may be completely discharged. FIG. 2D shows how the fuel cell auxiliary system operates in accordance with embodiments of the technology of the present disclosure. During a power outage, the substation batteries 206 would continue to discharge, powering the DC loads 207 and the CP AC loads 203b (as discussed above with respect to FIG. 2C). When the voltage of the substation batteries 206 drop below a discharge threshold, the fuel cell auxiliary system should be started to provide sufficient power for the black start process. Monitoring component 214 coupled to the DC bus 205 may continually monitor the voltage on the DC bus 205 in various embodiments. In other embodiments, the monitoring component 214 may be coupled to the substation batteries 206. In some embodiments, the discharge threshold may be 70-90% of full charge of the substation batteries 206. When the voltage of the substation batteries 206 falls below the discharge threshold, the monitoring component 214 may register a low voltage condition and report that to the substation monitoring equipment.

When both monitoring components 214 indicate the main AC bus 202a is in a de-energized state and the substation batteries 206 are in a low voltage condition, a start command may be sent to the substation fuel cell 208, and the switch 209 may be set to a closed position. In various embodiments, the substation batteries 206 may be used as the bridge power necessary to start up the substation fuel cell 208, eliminating the need to have a separate fuel cell starter battery. Once started up, the substation fuel cell 208 may be used to charge the substation batteries 206 and energize the DC bus 205, thereby powering the DC loads 207 and the CP AC loads 203b.

Unlike traditional fuel cells, the substation fuel cell 208 is designed to handle the load demands of substations like CP substation 200. Traditional fuel cells provide a stable, constant level of power. However, substation loads are generally not stable, change rapidly, and fluctuate significantly during equipment operation. For example, during a large outage, multiple motors and trip coils may be energized at once, causing a huge short-term surge in power consumption. Substation fuel cell 208 is designed to handle such surges in conjunction with the substation batteries 206. In various embodiments, when a surge occurs the substation batteries 206 handle the surge.

While the substation fuel cell 208 is running, the monitoring component 214 coupled to the DC bus 205 (or the substation batteries 206) may continue to monitor the voltage of the substation batteries. When the substation batteries 206 are fully charged, the monitoring component 214 coupled to the DC bus 205 (or the substation batteries 206) may indicate a "normal" state (i.e., substation batteries are charged) to the monitoring equipment. A stop command may be sent to the substation fuel cell 208 to stop power generation, and the switch 209 may be set to an open position, thereby disconnecting the substation fuel cell 208 from the substation batteries 206. The CP substation 200 will continue to operate as discussed with respect to FIG. 2C until either the utility grid power is restored or another low battery voltage state is registered by the monitoring component 214 coupled to the DC bus 205 (or the substation batteries 206). If utility grid power is restored, the monitoring component 214 coupled to the main AC bus 202a will register an energized state, and commands to set the ATS 210 to the first position and to open switch 213 may be sent, thereby returning the CP substation 200 to the state shown illustrated in FIG. 2A.

Figure 3:
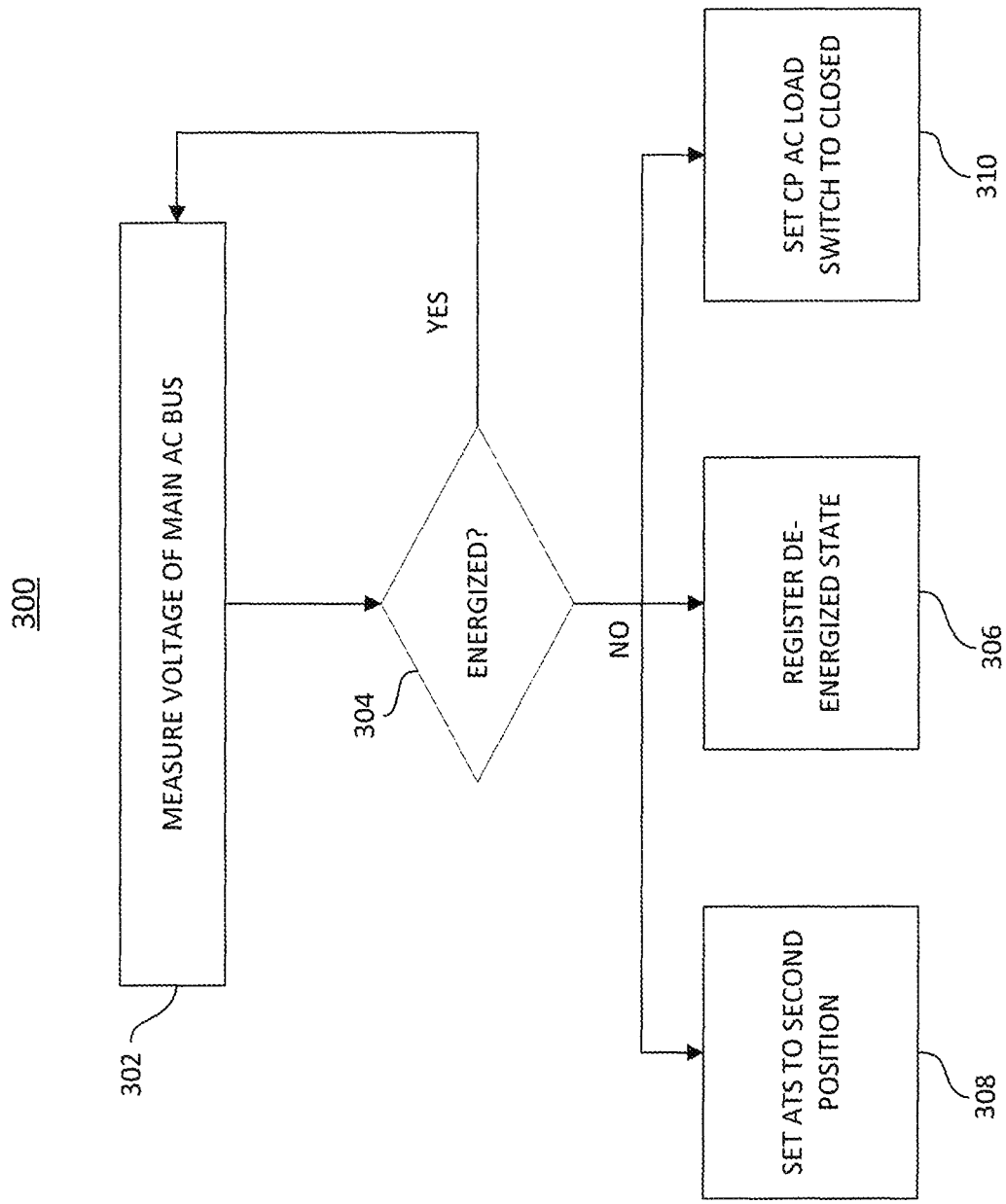
FIG. 3 illustrates an example process 300 for powering the CP AC loads via the substation batteries in accordance with embodiments disclosed herein.

FIG. 3 illustrates an example process 300 for powering the CP AC loads via the substation batteries in the event of a power outage, in accordance with embodiments of the technology disclosed herein. The process 300 maybe be performed in various embodiments by a monitoring component coupled to the main AC bus, such as the one discussed above with respect to FIGS. 2A-2D. At 302, the voltage of the main AC bus is measured. In various embodiments, the voltage may be measured using a voltage, current, or other electrical meter. At 304, whether the main AC bus is energized is determined based on the measured voltage. If the measurement indicates that the main AC bus is energized (i.e., the utility power grid is operational and there is no power outage), the process 300 repeats measuring at 302.

If it is determined at 304 that the main AC bus is not energized, that the main AC bus is de-energized is registered. In various embodiments, the substation monitoring equipment may register this state. The de-energized state may be registered in local memory at the substation, communicated to a central monitoring system maintained by the utility at another location, or a combination thereof. In some embodiments, where implemented in hardware, the de-energized state may be registered by flipping a register of the monitoring component from a low to a high state. At 308, the ATS is set to a second position, thereby isolating the main AC bus from the CP AC bus. At 310, the CP AC load switch is set to a closed position. In various embodiments, the CP AC load switch is the switch 213 discussed above with respect to FIGS. 2A-2D. By setting the ATS and closing the CP AC load switch in such a way, the CP AC loads may be powered by the substation batteries.

Figure 4:
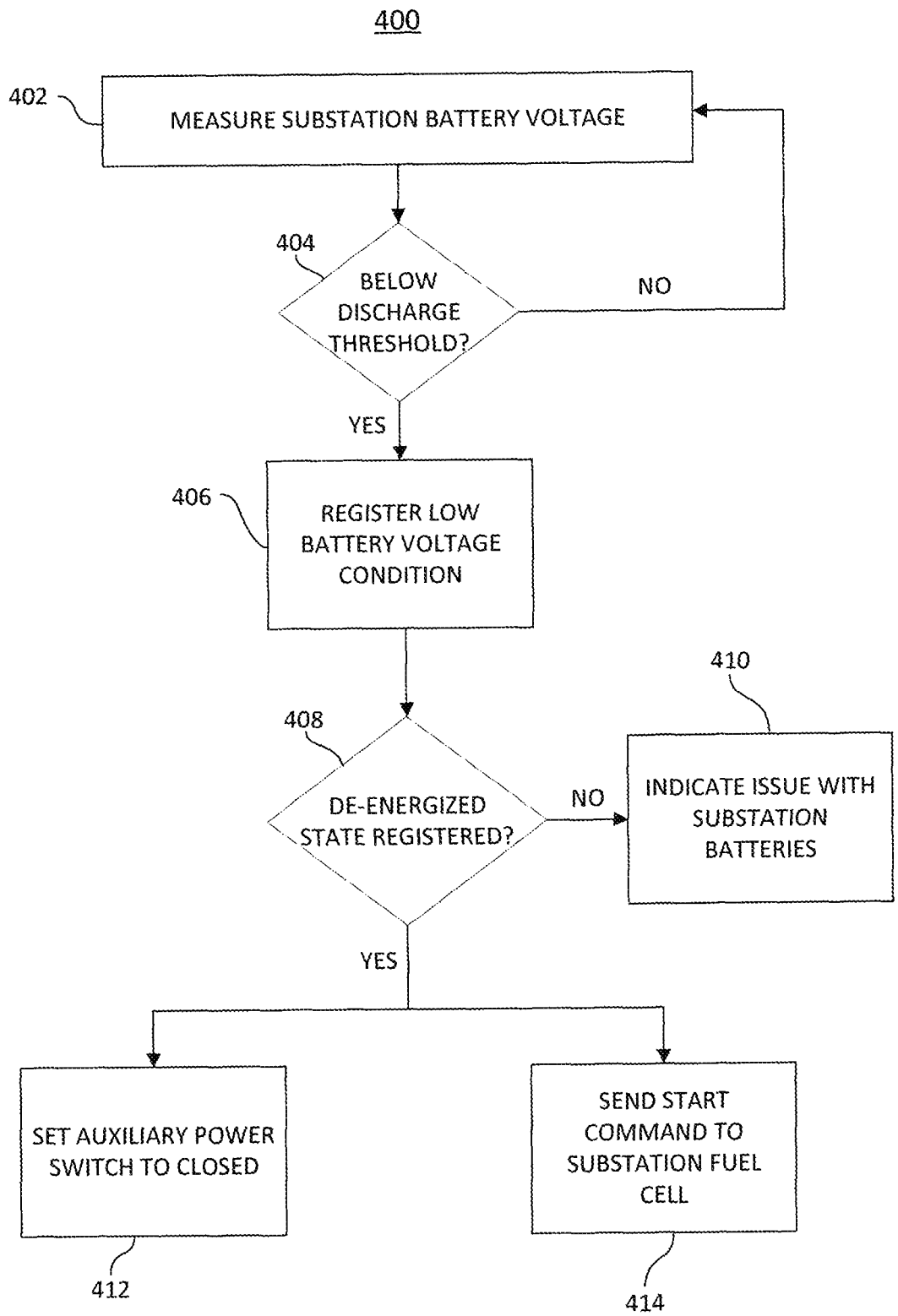
FIG. 4 illustrates an example process 400 for starting the auxiliary power system when a low battery condition arises in accordance with embodiments disclosed herein.

FIG. 4 illustrates an example process 400 for starting the auxiliary power system when a low battery condition arises, in accordance with embodiments of the technology disclosed herein. The process 400 may be performed in various embodiments by a monitoring component coupled to the DC bus or the substation batteries, such as the one discussed above with respect to FIGS. 2A-2D. At 402, the substation battery voltage is measured. In various embodiments, the voltage may be measured using a voltage, current, or other electrical meter. At 404, the measured voltage to a discharge threshold. In various embodiments, the discharge voltage is 70-90% of the full charge of the substation batteries. If the measured voltage does not fall below the discharge threshold, the process 400 repeats measuring at 402.

If the measured voltage does fall below the discharge voltage, a low battery voltage condition is registered at 406. In various embodiments, the substation monitoring equipment may register this condition. The low battery voltage condition may be registered in local memory at the substation, communicated to a central monitoring system maintained by the utility at another location, or a combination thereof. In some embodiments, where implemented in hardware, the low battery voltage condition may be registered by flipping a register of the monitoring component from a low to a high state.

At 408, whether a de-energized state, such as the de-energized state discussed above with respect to FIGS. 2B-2D and 3, has been registered is determined. If no de-energized state has been registered, but the low battery voltage condition has been registered, this could indicate that there is an issue with the substation batteries. In such cases, an indication may be communicated of an issue with the substation batteries. The indication may be communicated to the central monitoring system maintained by the utility in order to alert operators that an issue may exist requiring an inspection.

If a de-energized state is registered, the auxiliary power switch is set to closed at 412. In various embodiments, the auxiliary power switch is the switch 209 discussed above with respect to FIGS. 2A-2D. By closing the auxiliary power switch, the substation batteries may be used to provide the bridging power required for startup of the substation fuel cell. At 414, a start command is sent to the substation fuel cell.

There are many different types of electrical substations included within utility power grids, each varying in capacity and task dependent on the design of the utility grid. For ease of discussion, embodiments of the technology of the present disclosure were discussed with respect to electrical substations selected into the black start cranking path. Nothing in this disclosure, however, should be interpreted as limiting the scope of the technology disclosed herein to such embodiments, as a person of ordinary skill in the art would appreciate that embodiments of the technology are applicable to any substation within a utility power grid to ensure operability of critical components during prolonged power outages.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms "less than", "less than or equal to", "greater than", and "greater than or equal to", may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

Figure 5:
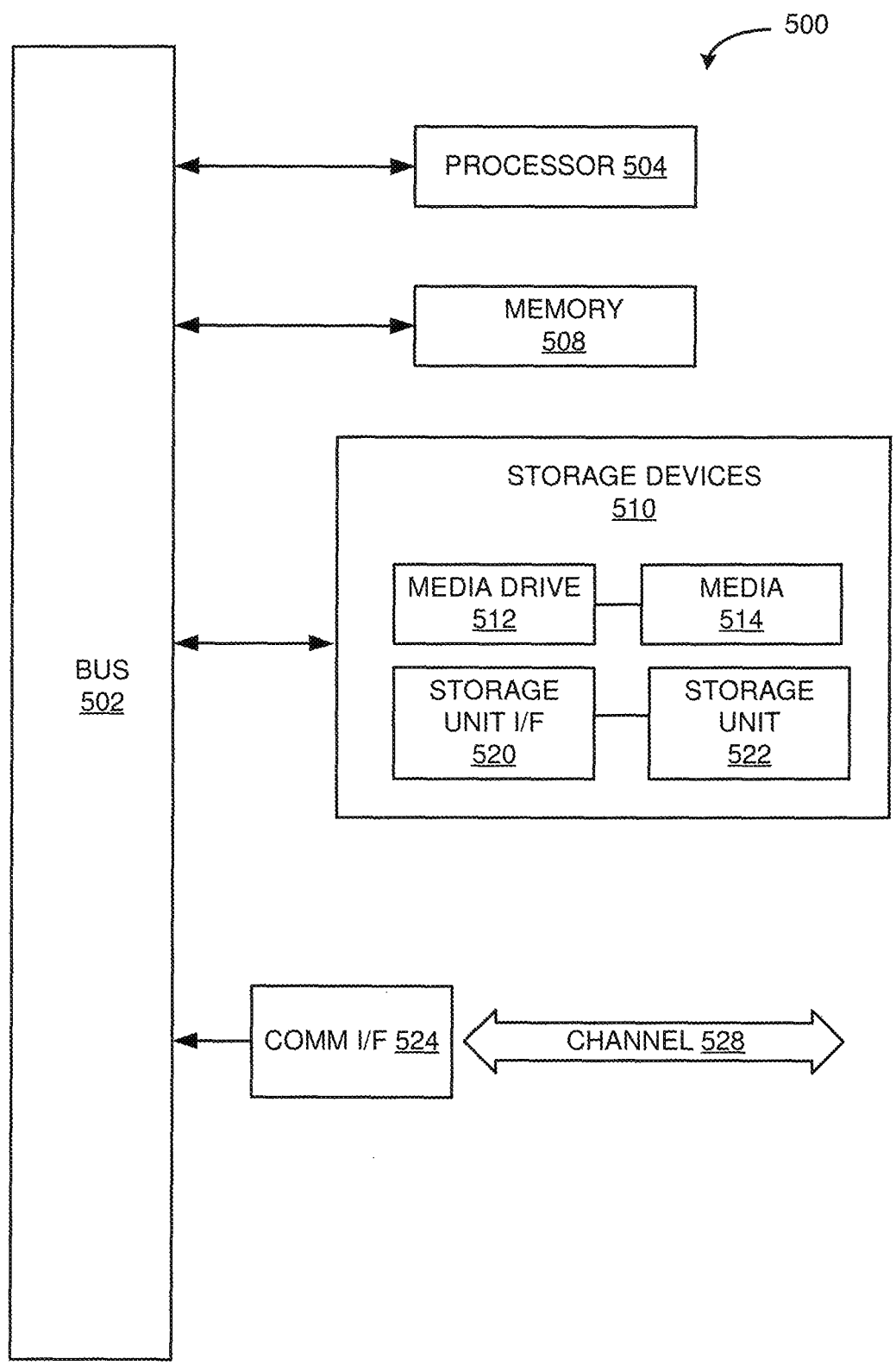
FIG. 5 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the technology using other computing components or architectures.

Referring now to FIG. 5, computing component 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. An auxiliary power system comprising:
   an electrical substation fuel cell electrically coupled to an electrical substation and configured to provide backup power, wherein the substation fuel cell is connected to substation batteries and utilizes the substation batteries during startup;
   a switch that enables the substation fuel cell to remain disconnected from substation batteries until needed; and
   a monitoring component coupled to the substation batteries, wherein the monitoring component registers a low voltage condition and reports the low voltage condition to the substation monitoring equipment when a voltage of the substation batteries falls below a discharge threshold comprising 70-90% of full charge of the substation batteries, and wherein the monitoring component registers a normal voltage condition when the substation batteries are fully charged, with the monitoring component, and the monitoring component reports the normal voltage condition to the substation monitoring equipment;
   wherein, upon the monitoring component registering the low voltage condition, powering the substation fuel cell on startup by the substation batteries; and
   wherein, upon the monitoring component registering the normal voltage condition, disconnecting the substation fuel cell from the substation batteries.

2. The auxiliary power system of claim 1, wherein an output of the substation fuel cell is connected to a DC bus, enabling the substation fuel cell to energize the DC bus when operating.

3. The auxiliary power system of claim 2, further comprising a diode disposed between the substation fuel cell and DC bus to ensure that electricity cannot flow back to the substation fuel cell from the DC bus.

4. The auxiliary power system of claim 3, further comprising a DC/DC converter placed on an output of the substation fuel cell.

5. A method for starting an auxiliary power system when a low battery condition arises, comprising:
   providing an electrical substation fuel cell electrically coupled to a main AC bus of an electrical substation and configured to provide backup power;
   measuring a substation battery voltage;
   comparing the measured voltage to a discharge threshold comprising 70-90% of full charge of the substation batteries;
   registering a low battery voltage condition when the measured voltage falls below the discharge threshold and reporting the low battery voltage condition to substation monitoring equipment;
   registering a normal battery voltage condition when the substation battery is fully charged and reporting the normal battery voltage condition to substation monitoring equipment;
   determining whether a de-energized state has been registered;
   determining whether there is an issue with the substation batteries when no de-energized state has been registered, and when the low battery voltage condition has been registered;
   powering the substation fuel cell on startup by the substation batteries upon determining that the de-energized state has been registered; and
   disconnecting the substation fuel cell from the substation batteries upon determining that no de-energized state has been registered.

6. The method of claim 5, further comprising setting an auxiliary power switch to closed if a de-energized state is registered.

7. The method of claim 6, further comprising utilizing the substation batteries to provide bridging power required for startup of the substation fuel cell.

* * * * *